Patented May 26, 1936

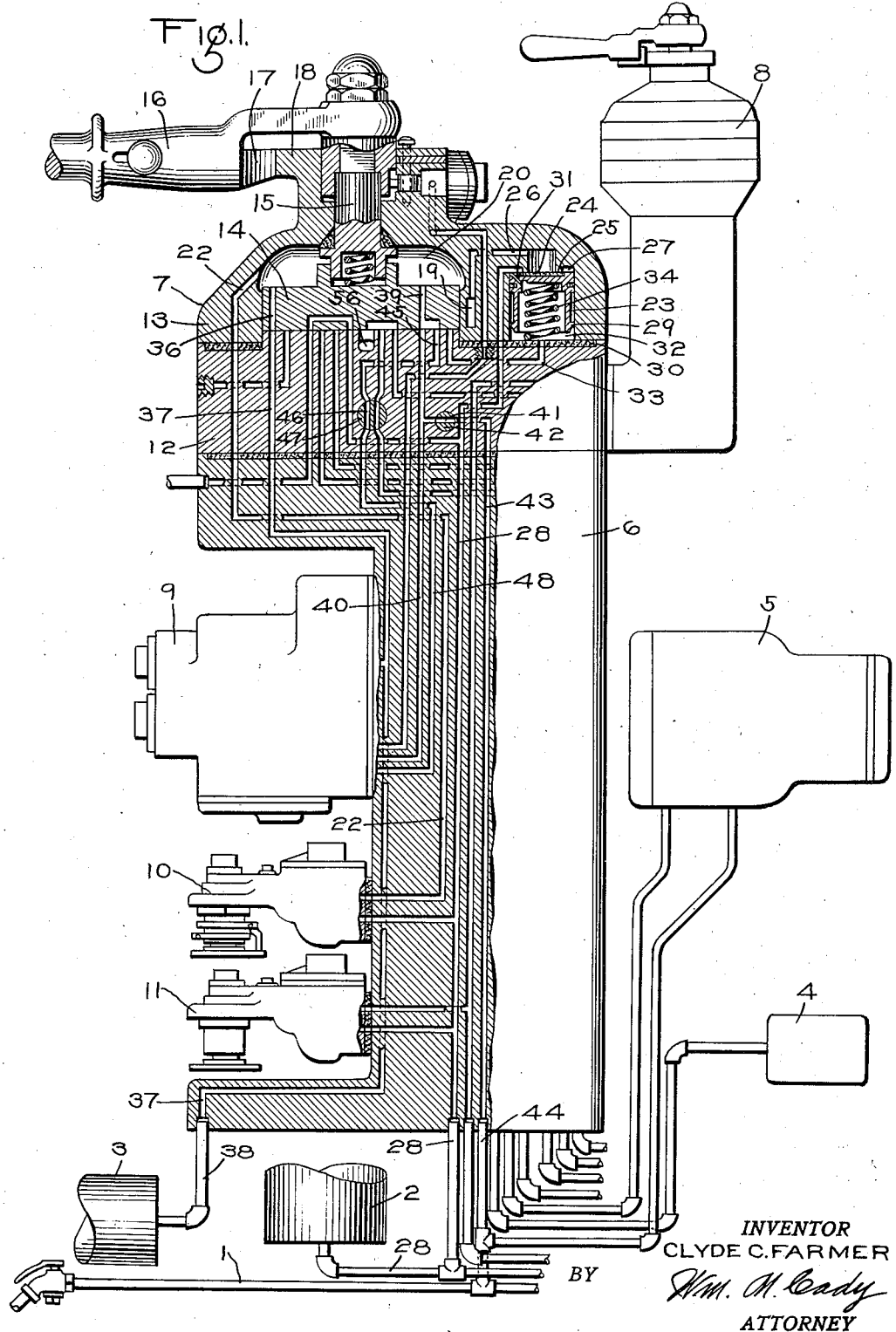

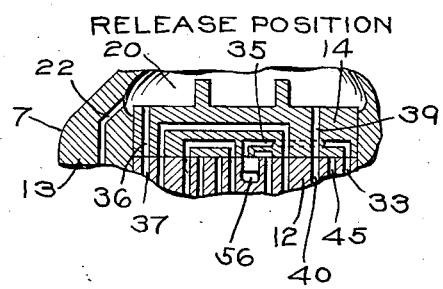
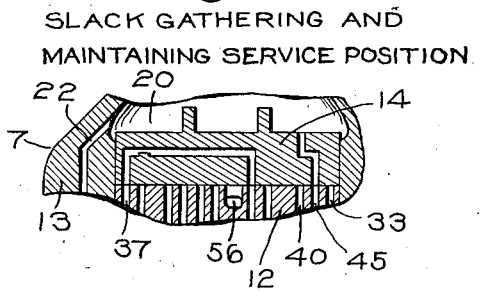
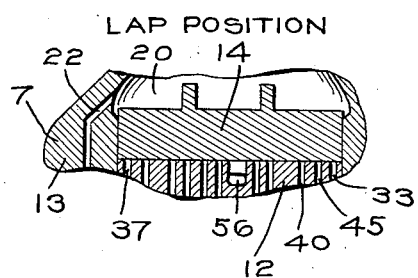
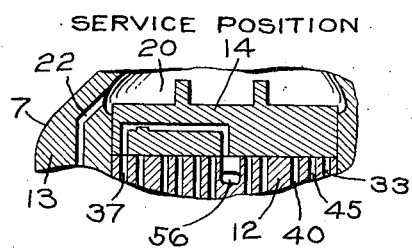
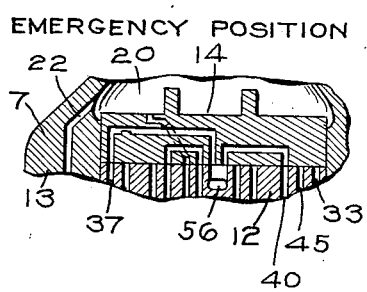
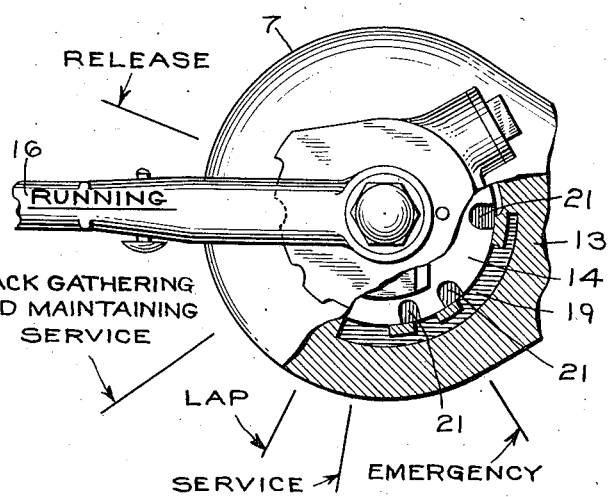

2,042,091

UNITED STATES PATENT OFFICE 2,042,091

FLUID PRESSURE BRAKE APPARATUS

Clyde C. Farmer, Pittsburgh, Pa., assignor to The Westinghouse Air Brake Company, Wilmerding, Pa., a corporation of Pennsylvania Original application August 17, 1933, Serial No. 685,576. Divided and this application April 19, 1934, Serial No. 721,307

9 Claims. (Cl. 303—1)

This application is a division of my pending application, Serial No. 685,576, filed August 17, 1933, for Improvements in fluid pressure brake systems.

The present invention relates to fluid pressure brake equipments and more particularly to the engineer's automatic brake valve device for controlling the operation of such equipments.

Heretofore it has been the usual practice to have the main reservoir of a fluid pressure brake equipment in constant open communication with the rotary valve chamber of the automatic brake valve device, and due to this, when the equipment is charged with fluid under pressure, the rotary valve of the device is urged against its seat by fluid at main reservoir pressure regardless of its brake controlling position. In cases where the rotary valve is of relatively large diameter, this has been found to be objectionable, in that the frictional resistance of the valve to movement by the engineer, due to the heavy loading by fluid at main reservoir pressure, renders difficult the operation of the rotary valve to its several brake controlling positions.

The principal object of the invention is to provide an automatic brake valve apparatus having means whereby the objectionable heavy loading of the rotary valve of the apparatus by fluid at main reservoir pressure is eliminated in every brake controlling position with the exception of release position.

Other objects and advantages of the invention will appear in the following more detailed description.

In the accompanying drawings Fig. 1 is a diagrammatic view, partly in section, of a portion of a fluid pressure brake apparatus embodying the invention, the automatic brake valve device being shown in running position; Figs. 2 to 6 inclusive, are fragmentary sectional views of the automatic brake valve device illustrating the rotary valve thereof in its several brake controlling positions; and Fig. 7 is a fragmentary plan view, partly in section, of the automatic brake valve device.

The portion of the fluid pressure brake apparatus shown in the drawings comprises a brake pipe 1, a main reservoir 2, an equalizing reservoir 3, a reduction limiting reservoir 4, a quick action valve device 5, a brake valve pedestal 6 on which is suitably mounted an automatic brake valve device 7, an independent brake valve device 8, an equalizing discharge valve device 9, a feed valve device 10 and a reducing valve device 11. These parts and devices may be identical with corresponding parts and devices shown and described in my aforementioned pending application, and since the present invention relates particularly to certain features of the automatic brake valve device the following detailed description will be limited to the parts and devices necessary to attain the object of the invention.

The automatic brake valve device 7 may comprise a casing having a valve seat section 12 and a cap or cover section 13 which are secured together and to the brake valve pedestal 6. The cover section 13 is provided with a bore containing a rotary valve 14, the face of which slidably contacts with the valve seat carried by the seat section 12 and the peripheral edge surface of which slidably contacts with the cover section 13 within said bore.

The rotary valve 14 is operatively connected to the inner end of an operating stem 15 suitably journaled in the cover section 13 of the casing. Exteriorly of the cover section, the stem is provided with an operating handle 16 through the medium of which the stem and thereby the rotary valve 14 are adapted to be rotated. This handle is preferably provided with the usual spring controlled plunger 17 which is adapted to cooperate with a notched quadrant 18, carried by the cover section 13, to yieldably resist movement of the handle from one position to another and to indicate to the engineer when the handle is in a proper control position.

The cover section 13 of the brake valve casing is provided with a recess which is open to the periphery of the rotary valve 14, the walls of the recess and peripheral surface of the valve defining a chamber 19 which, in each of the several operating positions of the valve, as will be observed from an inspection of Fig. 7 of the drawings, is in communication with a chamber 20 at the back of the rotary valve by way of one or more cavities 21 in the back of the valve. The rotary valve chamber 20 is constantly open to a fluid pressure supply passage 22 leading from the feed valve device 10.

For the purpose of controlling communication from the main reservoir 2 to the chamber 19 and consequently to the rotary valve chamber 20, a valve piston 23 is provided which is slidably mounted in the cover section 13 of the casing. This valve piston is provided, at one end, with a gasket 24 which is adapted to seat on an annular seat rib 25 carried by the casing and thus close communication through a passage 26 leading to the chamber 19. At the outside of the seat rib 25, the face of the valve piston and the casing define a chamber 27 with which the main reservoir 2 is in constant open communication by way of a pipe and passage 28. The valve piston, at its other end, is provided with a valve 29 which is adapted to seat on a gasket 30 clamped between the casing sections 12 and 13.

The chamber 27, at one side of the valve piston, is in constant communication, through a flow restricting port 31 of small diameter in the valve piston, with a chamber 32 at the other side, which chamber 32 is open to a passage 33 leading to the seat of the rotary valve 14. Contained in the chamber 32 is a coil spring 34 which acts to urge the valve piston in the direction toward the seat rib 25.

In charging a fluid pressure brake equipment it is the usual practice for the engineer to first move the rotary valve 14 of the brake valve device to release position and then, after a predetermined period of time has elapsed, to move the rotary valve to running position. With the rotary valve 14 in release position, the supply of fluid under pressure to charge the equipment is from the main reservoir 2 and with the rotary valve in running position the supply of fluid is from the feed valve device 10. By thus supplying fluid under pressure from the main reservoir, the time required to fully charge a brake equipment is materially reduced over that which would be required if the supply of fluid were from the feed valve device only.

It will be seen from Figs. 1 and 3 to 6 inclusive that in every position of the brake valve device, the rotary valve 14 laps the passage 33 so that in these positions the chamber 32 is charged with fluid at main reservoir pressure as supplied by way of pipe and passage 28, chamber 27 and port 31 in the valve piston. With the chamber 32 thus charged the spring 34 as well as the pressure of fluid in the chamber act to maintain the valve piston in its upper seated position as shown in Fig. 1.

When the rotary valve 14 is moved to release position, a cavity 35 in the valve connects the passage 33, leading from the chamber 32, to a passage 56 leading to the atmosphere. The flow area of each of the passages 33 and 56 and of the cavity 35 is greater than that of the port 31 in the valve piston, so that a reduction in the pressure of fluid in the chamber 32 results from the flow of fluid therefrom to the atmosphere.

With the chamber 32 thus vented, fluid at main reservoir pressure in chamber 27 acting on that portion of the valve piston which is exposed to the chamber 27, causes the valve piston to move inwardly from the position in which it is shown in Fig. 1, first unseating the gasket valve 24 and then seating the valve 29.

With the gasket valve 24 unseated, fluid under pressure flows from the chamber 27 to the rotary valve chamber 20 by way of passage 26, chamber 19, and cavities 21. As long as the rotary valve 14 is in release position, the valve piston will remain in its innermost position and fluid at main reservoir pressure will be supplied to the rotary valve chamber 20.

From the valve chamber 20 fluid under pressure flows by way of a port 36 in the rotary valve 14 and a passage 37 to the piston chamber of the equalizing discharge valve device 9, and from passage 37 fluid flows through a pipe 38 to the equalizing reservoir 3. Fluid also flows from the valve chamber 20 by way of a port 39 in the rotary valve and a passage 40 to a supply valve chamber in the equalizing discharge valve device 9. Since the equalizing discharge valve device 9 has been fully shown and described in my aforementioned pending application and since this device will not be included in the appended claims, a showing of the piston chamber and supply valve chamber above mentioned is deemed unnecessary.

From the passage 40 fluid under pressure flows to the brake pipe 1 by way of a passage 41 in a plug valve 42, a passage 43 and a pipe 44.

With the rotary valve 14 in running position as shown in Fig. 1 of the drawings, the port 36 in the valve continues to establish communication from the valve chamber 20 to passage 37 leading to the equalizing discharge valve device 9 and equalizing reservoir 3. Further the port 39 of the rotary valve continues to establish communication from the valve chamber 20 to the passage 40. This port 39 also establishes communication from the chamber 20 to an exhaust chamber (not shown) in the equalizing discharge valve device 9 by way of a passage 45, a passage 46 in a plug valve 47 and a passage 48. It will thus be seen that with the rotary valve in running position and the passage 22 open to the rotary valve chamber 20, the brake pipe 1, maintaining reservoir and several chambers of the equalizing discharge valve device are charged with fluid at feed valve pressure.

From an inspection of Fig. 7 of the drawings it will be seen that when the rotary valve 14 of the brake valve device is being moved from release position toward running position, the communication from the chamber 19 and consequently from the main reservoir to the chamber 20 by way of cavities 21 is gradually closed, so that the supply of fluid from the main reservoir 2 to the brake pipe is gradually reduced, and at substantially the same time as this communication is closed, the passage 33 is lapped by the rotary valve. With the passage 33 lapped, fluid under pressure flowing through the port 31 in the valve piston 23 from the chamber 27 to the chamber 32, increases the pressure in said chamber 32. When the pressure in chamber 32 has been increased to substantially the pressure of fluid acting on the other side of the valve piston, the spring 34 acts to move the valve piston to its outer seated position; thus closing off the further flow of fluid from the main reservoir to the chamber 19.

It will be seen from the foregoing description that the rotary valve of the automatic brake valve device is urged against its seat by fluid at feed valve pressure in every brake controlling position with the exception of release position instead of by fluid at main reservoir pressure as has been the practice heretofore, thus rendering the rotary valve more easily operable than has heretofore been possible.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, a main reservoir and a feed valve device, a brake valve device having a chamber supplied with fluid at feed valve pressure, a rotary valve in said chamber having a running position and a release position in which fluid under pressure is supplied from said chamber to the brake pipe, valve means operable at all times upon movement of the rotary valve to release position and as long as the rotary valve is maintained in release position for supplying fluid at main reservoir pressure to said chamber, and a cavity in the periphery of said rotary valve through which fluid supplied by said valve means flows to said chamber.

2. In a fluid pressure brake, the combination with a brake pipe, a main reservoir and a feed valve device, a brake valve device having a chamber supplied with fluid at feed valve pressure, a rotary valve in said chamber having a running position and a release position in which fluid under pressure is supplied from said chamber to the brake pipe, valve means operable at all times upon movement of the rotary valve to release position and as long as the rotary valve is maintained in release position for supplying fluid at main reservoir pressure to said chamber, a cavity in the periphery of said rotary valve through which fluid supplied by said valve means flows to said chamber, and means cooperating with the rotary valve to gradually throttle the supply of fluid at main reservoir pressure to said chamber as the rotary valve is moved from release position toward running position.

3. In a fluid pressure brake, the combination with a brake pipe, a main reservoir and a feed valve device, a brake valve device having a chamber supplied with fluid at feed valve pressure, a rotary valve in said chamber having a running position and a release position in which fluid under pressure is supplied from said chamber to the brake pipe, a communication through which fluid at main reservoir pressure is adapted to be supplied to said chamber, a spring, a valve piston subject on one side to fluid under pressure and the pressure of said spring for maintaining said communication closed while the rotary valve is in running position and operative at all times upon a reduction in the fluid pressure for supplying fluid at main reservoir pressure through said communication to said chamber, and means included in the rotary valve for reducing the pressure on said side of the valve piston upon movement of the rotary valve to release position and as long as the rotary valve is in release position.

4. In a fluid pressure brake, the combination with a brake pipe, a main reservoir and a feed valve device, a brake valve device having a chamber supplied with fluid at feed valve pressure, a rotary valve in said chamber having a running position and a release position in which fluid under pressure is supplied from said chamber to the brake pipe, a communication through which fluid at main reservoir pressure is adapted to be supplied to said chamber, a spring, a valve piston subject on one side to fluid under pressure and on the other side to the pressure of said spring and fluid under pressure supplied thereto through a restricted port for maintaining said communication closed while the rotary valve is in running position and operative at all times upon a reduction in the pressure of fluid on the spring side of said valve piston to supply fluid at main reservoir pressure to said chamber, and means included in the rotary valve operated upon movement of said rotary valve to release position for venting fluid under pressure from the spring side of the valve piston as long as the rotary valve is in release position.

5. In a fluid pressure brake, the combination with a brake pipe, a main reservoir and a feed valve device, a brake valve device having a chamber supplied with fluid at feed valve pressure, a rotary valve in said chamber having a running position and a release position in which fluid under pressure is supplied from said chamber to the brake pipe, a communication through which fluid at main reservoir pressure is adapted to be supplied to said chamber, a spring, a valve piston subject on one side to fluid under pressure and the pressure of said spring for maintaining said communication closed while the brake valve device is in running position and operative at all times upon a reduction in the fluid pressure for supplying fluid at main reservoir pressure through said communication to said chamber, and a cavity in said rotary valve establishing communication through which fluid under pressure is vented to effect a reduction in the pressure of fluid on said side of the valve piston as long as the rotary valve is in release position.

6. In a fluid pressure brake, the combination with a brake pipe, a main reservoir and a feed valve device, of a brake valve device comprising a casing having a chamber supplied with fluid under pressure from the feed valve device, a rotary valve in said chamber having a running position for establishing communication through which fluid under pressure is supplied from said chamber to the brake pipe, and having a release position in which said communication is closed and another communication is established from the valve chamber to the brake pipe, pressure sensitive means closing communication from the main reservoir to said chamber when the rotary valve is in running position and operative at all times upon movement of the rotary valve to release position and as long as the rotary valve is in release position for establishing communication through which fluid under pressure is supplied from the main reservoir to said chamber and consequently to the brake pipe, and means included in the rotary valve for controlling the operation of said pressure sensitive means.

7. In a fluid pressure brake in combination, a brake pipe, a main reservoir, a brake valve device comprising a rotary valve having a release position in which fluid under pressure is supplied from the main reservoir to the brake pipe, valve means automatically operative in the release position of the rotary valve for supplying fluid under pressure from the main reservoir to the brake pipe without limitation as long as the rotary valve is in release position, and means included in the rotary valve for controlling the operation of the valve means.

8. In a fluid pressure brake, in combination, a brake pipe, a main reservoir, a feed valve device, a brake valve device having a chamber supplied with fluid at feed valve pressure, a rotary valve in said chamber having a running position and a release position in either of which positions fluid under pressure is supplied from said chamber to the brake pipe, valve means automatically operative to supply fluid under pressure from the main reservoir to the chamber, and means in said rotary valve adapted in the release position of the rotary valve to effect the automatic operation of said valve means to supply fluid under pressure from the main reservoir to the chamber without limitation.

9. In a fluid pressure brake, in combination, a brake pipe, a main reservoir, a feed valve device, a brake valve device having a chamber supplied with fluid at feed valve pressure, a rotary valve in said chamber having a running position and a release position in either of which positions fluid under pressure is supplied from said chamber to the brake pipe, valve means automatically operative to supply fluid under pressure from the main reservoir to the chamber, and means in said rotary valve adapted in the release position of the rotary valve to effect the automatic operation of said valve means to supply fluid under pressure from the main reservoir to the chamber as long as the rotary valve is in release position.

CLYDE C. FARMER.